No. 717,214.  
C. M. KEMP.  
HEATING APPARATUS.  
(Application filed Oct. 29, 1901.)
Patented Dec. 30, 1902.
(No Model.)
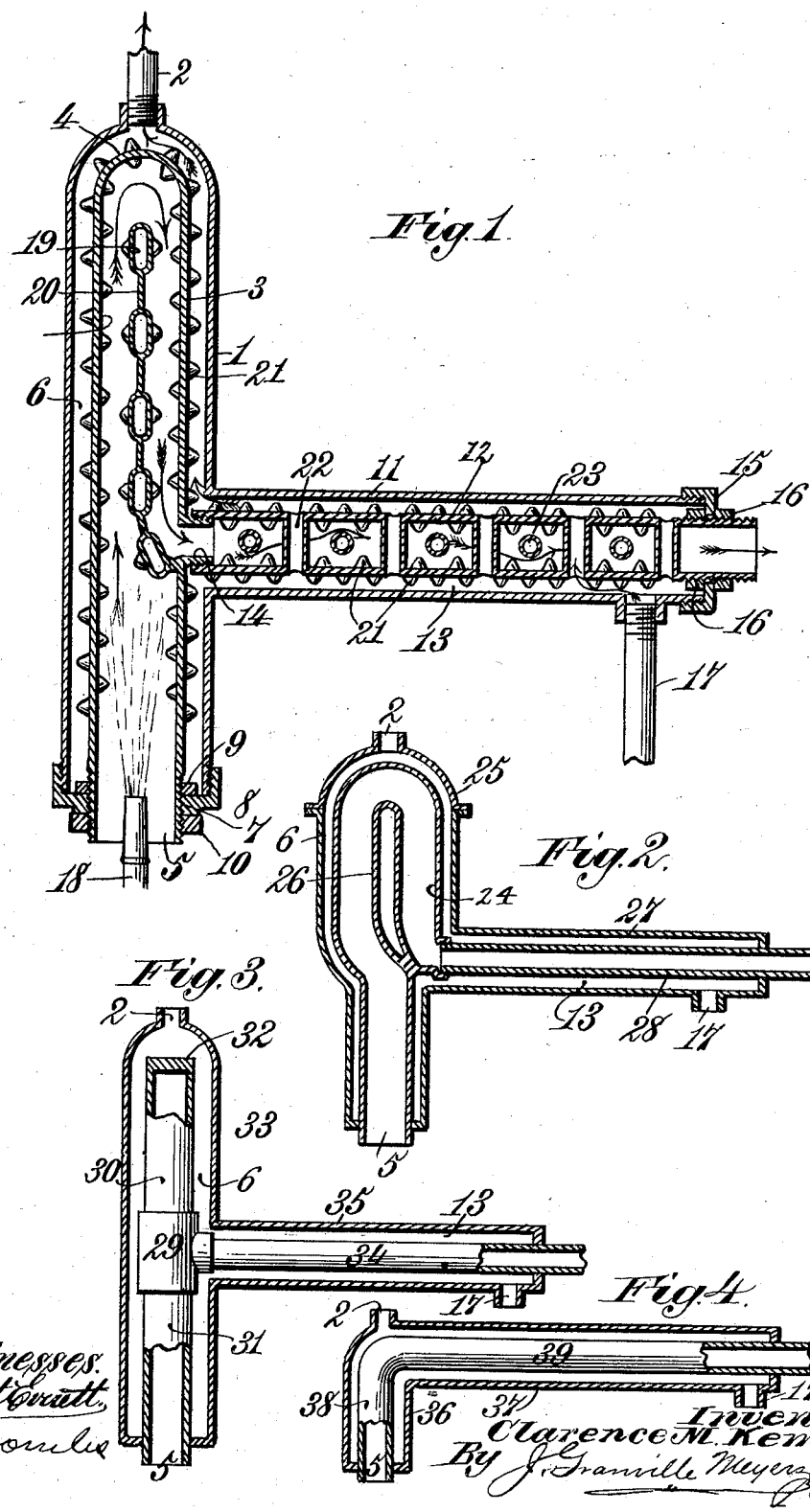
Witnesses.  
Inventor,  
Clarence M. Kemp.  
By J. Granville Meyer  
Atty.
THE NORRIS PETERS CO., PHOTO-LITHO., WASHINGTON, D. C.

UNITED STATES PATENT OFFICE.

CLARENCE M. KEMP, OF BALTIMORE, MARYLAND.

HEATING APPARATUS.

SPECIFICATION forming part of Letters Patent No. 717,214, dated December 30, 1902.

Application filed October 29, 1901. Serial No. 80,405. (No model.)

*To all whom it may concern:*

Be it known that I, CLARENCE M. KEMP, a citizen of the United States, residing at Baltimore, in the State of Maryland, have invented new and useful Improvements in Heating Apparatus, of which the following is a specification.

This invention relates to water-heaters for household and other purposes, and especially to that class of such heaters which are known on the market as "instantaneous water-heaters;" and it has for its object to provide a simple and inexpensive heater which will be very compact and small proportionately to its heating capacity, which will be economical in the consumption of fuel, that will practically utilize all the heat units generated, and which will quickly raise the water to a high temperature.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a central vertical sectional view of one form of my improved water-heater. Fig. 2 is a similar view of a modified form thereof, and Figs. 3 and 4 are similar views of further modifications.

In the several different forms illustrated of my improved heater the same general principle will be found to exist—viz., the heat and flames when they are at their highest temperature are brought into contact with the hottest water, and this at a point just as the water is about to be discharged from the heater, while the nearly-spent heat and products of combustion are led into contact with the cold water as the latter is fed to the heater, the arrangement being such that as the water enters the heater when it is at its coldest it meets a current of nearly-spent heat and absorbs substantially all the heat units therefrom. Then as the water passes on in its passage through the heater it is gradually subjected to a continuously-increasing temperature, thus being raised to a higher and higher temperature, until just before the water escapes from the heater it reaches its highest temperature and is then and there subjected to the greatest heat.

I will now describe my improved means for carrying the objects of my invention into practical effect, first describing the apparatus shown in Fig. 1 of the drawings. Referring to said figure, the numeral 1 indicates a vertical tubular or cylindrical casing having tapped in its upper end a water-discharge pipe 2. Arranged concentrically within the casing 1 is a tube, pipe, or cylindrical casing 3, closed at its upper end, as at 4, and open at its lower end, as indicated at 5. The inner casing 3, which for the sake of description I will denominate a "fire-tube," is of less diameter externally than the internal diameter of the outer casing or water-tube 1, whereby a space 6 is formed between said tubes for the reception of water. The lower end of the fire-tube 3 is threaded, as at 7, and projects through and below the lower open end of the water-tube 1, and screwed over the threaded end of the fire-tube is an annular cap or thimble 8, that is also screwed over the exteriorly-threaded lower end of the water-tube 1. Washers 9 and 10 are also screwed over the threaded end of the fire-tube on opposite sides of the thimble 8 and render the joint between the latter and the fire-tube water-tight. The water-tube 1 is provided on one side with a laterally-projecting water-tube 11, and disposed therein is a fire-tube 12, preferably concentric thereto, an annular water-space 13 being thus formed between said tubes 11 and 12, which communicates with the water-space 6 before referred to. The inner end of the fire-tube 12 is screwed over a threaded nipple 14, formed on one side of the fire-tube 3, and the opposite end of said tube 12 projects through the outer end of the water-tube 11 and is fitted water-tight therein by a thimble 15 and washers 16, similar in all respects to the thimble 8 and washers 9 and 10, before described. Tapped in the outer end portion of the water-tube 11 is a water-inlet pipe 17, which may lead from any suitable source of supply. Arranged at the lower end of the fire-tube 3 is a burner 18 of any suitable type, a Bunsen gas-burner being preferably employed for the purpose. Disposed centrally in the upper portion of the fire-tube 3 is a vertical transverse partition, consisting, preferably, of a plurality of horizontal flat tubular flues 19, that communicate at their opposite ends with the water-space 6 and are united at their adjacent edges by integral webs 20, that extend transversely from one side to the other of the fire-tube 3. The said partition extends from a point near the top of the fire-tube 3, as shown, to a point immediately beneath the nipple 14, where it is deflected to one side and united to the side of the fire-tube. Integral projections or teats 21 are formed on both the interiors and exteriors of the fire-tubes 3 and 12 and greatly increase the heat absorbing and conducting surfaces of said tubes. Transverse flues or pipes 22 and 23 are also fitted in the fire-tube 12 and communicate at their opposite ends with the water-space 13.

The operation of the device thus constructed will be readily understood. The heat and products of combustion from the burner 18 ascend in the vertical fire-tube 3, pass over the top of the partition therein, thence down between said partition and the side of the fire-tube into the inner end of the fire-tube 12, through the latter, and are discharged through the outer end thereof. The water to be heated is admitted by the pipe 17 into the water-space 13 and passes through the latter into the water-space 6, ascends in the latter, and is discharged through the outlet-pipe 2. In its passage from the inlet 17 to the outlet 2 the water will circulate through the transverse tubes or flues 22, 23, and 19 and will be thereby subjected to an increased heating-surface. Owing to the natural tendency of the heat to ascend, it will be retarded when it reaches the upper end of the fire-tube 3 and will tend to heat this part of the heater to a high temperature, and as it continues on its passage to the discharge end of the lateral fire-tube 12 the heat units will be gradually absorbed by the water, whereby when the gases are finally discharged they will practically have given up all their heat units and will be spent. As the gases then approach the water-inlet they become cooler and cooler, and as the water enters the water-space 13 and passes therethrough it is subjected to a gradually-increasing heat, and as it passes through the water-space 6 it is gradually raised to a higher and higher temperature, being subjected to the greatest heat when it itself is hottest and just before it is discharged through the outlet 2. In such manner the greatest number of heat units are absorbed by the water, and the latter is quickly heated to a high temperature with an economical expenditure of fuel.

In Fig. 2 of the drawings I have shown a similar arrangement slightly modified in the details of construction. As shown in said figure, the upper portions of the vertical fire-tube 24 and water-tube 25 are slightly enlarged, and the central vertical partition in the fire-tube is constructed in the form of a flat hollow diaphragm 26, that communicates at its opposite ends with the water-space 6.

The operation is the same as that described with reference to the arrangement shown in Fig. 1. The water enters through the inlet 17, flows through the water-space 13 between the lateral water-tube 27 and fire-tube 28 and into the water-space 6 and out of the latter by the outlet 2, the incoming cold water first meeting the nearly-spent gases and then being more and more highly heated, the water being subjected to the greatest heat when it itself is hottest or just as it is about to be discharged from the heater. The same principle is also retained in the arrangement shown in Fig. 3 of the drawings, the vertical fire-tube in such case consisting of a T-coupling 29, having fitted in its opposite ends, respectively, pipes 30 and 31, the upper end of the former being closed, as at 32. The fire-tube is concentrically inclosed within a vertical water-tube 33, as in the first instance, and is provided intermediate its ends with a laterally-projecting fire-tube 34, inclosed concentrically within a water-tube 35, projecting laterally from one side and communicating with the interior of the water-tube 33. The operation is precisely the same as that before described.

In Fig. 4 of the drawings I have illustrated a still further modified construction of the heater, the numerals 36 and 37 indicating, respectively, the vertical and lateral water-tubes and the numerals 38 and 39 the vertical and lateral fire-tubes, the water and fire tubes in the present instance being in the form of pipe-elbows and inclosed concentrically one within the other, as shown, the operation being in all respects the same as that hereinbefore described.

I have described my improved heater as being a water-heater; but it will be obvious that it may be employed for heating other fluids, such as air, for example. While primarily it is designed for heating baths, it may also be equally well employed as a steam-heater, hot-water heater, or hot-air heater for heating rooms and buildings, for mechanical as well as domestic purposes, and for many other purposes where it is desirable to quickly and economically generate heat efficiently.

I have shown the laterally-projecting water and fire tubes disposed horizontally in the several different figures of the drawings; but it will be manifest that they may be inclined in either an upward or downward direction without departing from the spirit of my invention. While the parts are shown concentrically arranged, the spirit of the invention does not require this exact construction in this particular.

Having described my invention, what I claim is—

1. In a heater of the class described, the combination with a vertical tubular casing provided with a laterally-projecting tubular casing leading from one side thereof and having communication therewith, the vertical casing being provided at its upper end with an outlet and the lateral casing being provided at its outer end with an inlet for the medium to be heated, of a vertical fire-tube disposed concentrically within the said vertical tubular casing and provided with a laterally-projecting fire-tube extending through and disposed concentrically in the lateral tubular casing and open at its outer end, the vertical fire-tube being closed at its top and open at its bottom, and a burner arranged at the lower open end of the vertical fire-tube, substantially as described.

2. In a heater of the class described, the combination with a vertical tubular casing provided with a laterally-projecting tubular casing leading from one side thereof and having communication therewith, the vertical casing being provided at its upper end with an outlet and the lateral casing being provided at its outer end with an inlet for the medium to be heated, of a vertical fire-tube disposed concentrically within the said vertical tubular casing and provided with a laterally-projecting fire-tube extending through and disposed concentrically in the lateral tubular casing and open at its outer end, the vertical fire-tube being closed at its top and open at its bottom, a vertical transverse partition in the upper portion of the vertical fire-tube and extending from a point near the upper end thereof to a point below the inner end of the lateral fire-tube, the lower end of said partition being deflected to one side and joined to the side of the vertical fire-tube, and a burner arranged at the lower open end of the vertical fire-tube, substantially as described.

3. In a heater of the class described, the combination with a vertical tubular casing provided with a laterally-projecting tubular casing leading from one side thereof and having communication therewith, the vertical casing being provided at its upper end with an outlet and the lateral casing being provided at its outer end with an inlet for the medium to be heated, of a vertical fire-tube disposed concentrically within the said vertical tubular casing and provided with a laterally-projecting fire-tube extending through and disposed concentrically in the lateral tubular casing and open at its outer end, the vertical fire-tube being closed at its top and open at its bottom, a vertical transverse partition in the upper portion of the vertical fire-tube and extending from a point near the upper end thereof to a point below the inner end of the lateral fire-tube, the lower end of said partition being deflected to one side and joined to the side of the vertical fire-tube, the said partition being hollow and communicating at its opposite open ends with the interior of the vertical tubular casing, substantially as described.

4. In a heater of the class described, the combination with a vertical tubular casing provided with a laterally-projecting tubular casing leading from one side thereof and having communication therewith, the vertical casing being provided at its upper end with an outlet and the lateral casing being provided at its outer end with an inlet for the medium to be heated, of a vertical fire-tube disposed concentrically within the said vertical tubular casing and provided with a laterally-projecting fire-tube extending through and disposed concentrically within the lateral tubular casing and open at its outer end, the vertical fire-tube being closed at its upper end and open at its bottom, a vertical transverse partition in the upper portion of the vertical fire-tube and extending from a point near the upper end thereof to a point below the inner end of the lateral fire-tube, the lower end of the partition being deflected to one side and joined to the side of the vertical fire-tube, the said partition comprising a plurality of horizontal tubes or flues communicating at their opposite open ends with the interior of the vertical tubular casing and integral webs uniting the adjacent edges of said flues or tubes, and a burner arranged at the lower open end of the vertical fire-tube, substantially as described.

5. In a heater of the class described, the combination with a vertical tubular casing provided with a laterally-projecting tubular casing leading from one side thereof and having direct communication therewith, the vertical casing being provided at its top with an outlet and the lateral casing being provided at its outer end with an inlet for the medium to be heated, of a vertical fire-tube disposed concentrically within the vertical tubular casing and provided with a laterally-projecting fire-tube extending through and disposed concentrically within the lateral tubular casing and open at its outer end, the vertical fire-tube being closed at its top and open at its bottom, a vertical transverse partition in the upper portion of the vertical fire-tube and extending from a point near the top thereof to a point below the inner end of the lateral fire-tube, the lower end of the partition being deflected to one side and joined to the side of the vertical fire-tube, the said partition comprising a plurality of horizontal tubes or flues approximately oval in cross-section which communicate at their opposite ends with the interior of the vertical tubular casing and integral webs uniting the adjacent edges of said flues or tubes, and a burner arranged at the lower open end of the vertical fire-tube, substantially as described.

6. In a heater of the class described, the combination with a vertical tubular casing provided with a laterally-projecting tubular casing leading from one side thereof and having direct communication therewith, the vertical casing being provided at its top with an outlet and the lateral casing being provided at its outer end with an inlet for the medium to be heated, of a vertical fire-tube disposed concentrically within the said vertical tubular casing and provided with a laterally-projecting fire-tube extending through and disposed concentrically within the lateral tubular casing and open at its outer end, the vertical fire-tube being closed at its top and open at its bottom, and a burner arranged at the lower open end of the vertical fire-tube, said fire-tubes being provided interiorly and exteriorly with integral teats or projections, substantially as described.

7. In a heater of the class described, the combination with a vertical tubular casing provided with a laterally-projecting tubular casing leading from one side thereof and having direct communication therewith, the vertical casing being provided at its top with an outlet and the lateral casing being provided at its outer end with an inlet for the medium to be heated, of a vertical fire-tube disposed concentrically within the vertical tubular casing and provided with a laterally-projecting fire-tube extending through and disposed concentrically within the lateral tubular casing and open at its outer end, a plurality of transverse tubes or flues arranged in the lateral fire-tube and communicating at their opposite ends with the interior of the lateral tubular casing, the vertical fire-tube being closed at its top and open at its bottom, and a burner arranged at the lower open end of the vertical fire-tube, substantially as described.

In testimony whereof I have hereunto set my hand in presence of two subscribing witnesses.

CLARENCE M. KEMP.

Witnesses:
NANNIE WELLER,
JULIA MCCANN.